US012698209B2

(12) United States Patent  
Erlebacher et al.

(10) Patent No.: US 12,698,209 B2  
(45) Date of Patent: Aug. 4, 2026

(54) PRODUCTION OF CARBON MATERIALS VIA METAL MELT SPINNING

(71) Applicant: The Johns Hopkins University, Baltimore, MD (US)

(72) Inventors: Jonah D. Erlebacher, Chevy Chase, MD (US); Gina Reba Greenidge, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 454 days.

(21) Appl. No.: 18/274,840

(22) PCT Filed: Feb. 1, 2022

(86) PCT No.: PCT/US2022/014721  
§ 371 (c)(1),  
(2) Date: Jul. 28, 2023

(87) PCT Pub. No.: WO2022/165413  
PCT Pub. Date: Aug. 4, 2022

(65) Prior Publication Data  
US 2024/0101426 A1     Mar. 28, 2024

Related U.S. Application Data

(60) Provisional application No. 63/144,092, filed on Feb. 1, 2021.

(51) Int. Cl.  
C01B 32/05 (2017.01)  
B22D 11/00 (2006.01)  
(Continued)

(52) U.S. Cl.  
CPC ............ C01B 32/05 (2017.08); B22D 11/001 (2013.01); B22D 11/0611 (2013.01); C21D 8/0257 (2013.01); C21D 2211/004 (2013.01)

(58) Field of Classification Search  
CPC ... C01B 32/05; B22D 11/001; B22D 11/0611; C21D 8/0257; C21D 2211/004  
(Continued)

(56) References Cited

U.S. PATENT DOCUMENTS 3,253,886 A     5/1966   Lamprey et al.  
3,284,161 A     11/1966  Pohlenz et al.  
(Continued)

FOREIGN PATENT DOCUMENTS

CN     109097583     12/2018  
CN     110607456     12/2019  
(Continued)

OTHER PUBLICATIONS

Machine translation of JP 2015171968 A. (Year: 2015).*  
(Continued)

*Primary Examiner* — Coris Fung  
*Assistant Examiner* — Catriona M Corallo  
(74) *Attorney, Agent, or Firm* — Fish & Richardson P.C.

(57)     ABSTRACT

Transforming a first carbon material into a second carbon material includes preparing a solid metal-carbon alloy including a metal and the first carbon material, heat treating the solid metal-carbon alloy to form a first mixture including the metal and the second carbon material, and contacting the first mixture with a quantity of hydrogen halide to yield a quantity of hydrogen gas, a second mixture including the second carbon material, and a metal halide including the metal. The first carbon material is dissolved in the metal, and the second carbon material differs from the first carbon material.

32 Claims, 5 Drawing Sheets

(51) Int. Cl.
    *B22D 11/06*       (2006.01)
    *C21D 8/0247*     (2026.01)

(58) Field of Classification Search
    USPC .................................................... 423/445 R
    See application file for complete search history.

(56)           References Cited

U.S. PATENT DOCUMENTS

| | | | |
|---|---|---|---|
| 3,505,018 A | 4/1970 | Bawa et al. | |
| 4,080,510 A | 3/1978 | Beck | |
| 4,292,282 A | 9/1981 | Welsh et al. | |
| 4,318,733 A | 3/1982 | Ray et al. | |
| 4,913,877 A | 4/1990 | Yohe | |
| 4,913,887 A | 4/1990 | Sato et al. | |
| 5,767,165 A | 6/1998 | Steinberg et al. | |
| 6,312,658 B1 | 11/2001 | Hufton et al. | |
| 6,358,618 B1 | 3/2002 | Grossman | |
| 7,470,647 B2 | 12/2008 | Cai et al. | |
| 7,588,746 B1 | 9/2009 | Muradov et al. | |
| 7,767,182 B2 | 8/2010 | Tada et al. | |
| 8,771,637 B2 | 7/2014 | Wynn et al. | |
| 8,911,519 B2 | 12/2014 | Niitsuma et al. | |
| 9,005,571 B2 | 4/2015 | Biniwale et al. | |
| 9,061,909 B2 | 6/2015 | Noda et al. | |
| 9,090,978 B2 | 7/2015 | Beckett | |
| 9,359,200 B2 | 6/2016 | Maass et al. | |
| 9,776,860 B2 | 10/2017 | Erlebacher et al. | |
| 2008/0157047 A1 | 7/2008 | Neusch | |
| 2009/0060805 A1 | 3/2009 | Muradov et al. | |
| 2009/0208391 A1 | 8/2009 | Ma et al. | |
| 2011/0024697 A1 | 2/2011 | Biris et al. | |
| 2012/0237687 A1 | 9/2012 | Matsunaga et al. | |
| 2013/0022861 A1 | 1/2013 | Hidekazu et al. | |
| 2015/0218383 A1 | 8/2015 | Johnson et al. | |
| 2015/0366005 A1 | 12/2015 | Janas et al. | |
| 2017/0240421 A1 | 8/2017 | Erlebacher et al. | |
| 2021/0061654 A1 | 3/2021 | McFaralnd et al. | |
| 2024/0059560 A1 | 2/2024 | Erlebacher et al. | |
| 2025/0066201 A1 | 2/2025 | Erlebacher et al. | |
| 2025/0187925 A1 | 6/2025 | Erlebacher et al. | |

FOREIGN PATENT DOCUMENTS

| | | |
|---|---|---|
| CN | 110 642 243 A | 1/2020 |
| EP | 1995360 | 11/2008 |
| FR | 724905 | 5/1932 |
| JP | 2015171968 | 10/2015 |
| RU | 2295811 | 3/2007 |
| SU | 1331435 | 8/1987 |
| WO | WO 1999066096 A1 | 12/1999 |
| WO | WO 2008157047 A1 | 12/2008 |
| WO | WO 2011/009642 A1 | 1/2011 |
| WO | WO 2011029144 A1 | 3/2011 |
| WO | WO 2012/056184 A2 | 5/2012 |
| WO | WO 2013111015 | 8/2013 |
| WO | WO 2016154666 | 10/2016 |
| WO | WO 2018110263 A1 | 6/2018 |
| WO | WO 2018141911 | 8/2018 |
| WO | WO 2019197256 | 10/2019 |
| WO | WO 2022081170 A1 | 4/2022 |
| WO | WO 2022150639 | 7/2022 |
| WO | WO 2023133253 A2 | 7/2023 |
| WO | WO 2023133253 A3 | 9/2023 |

OTHER PUBLICATIONS

Ahniyaz et al., "Progress in solid-state high voltage lithium-ion battery electrolytes," Advances in Applied Energy, Nov. 19, 2021, 4:100070, 22 pages.

Sánchez-Bastardo et al., "Methane pyrolysis for zero-emission hydrogen production: a potential bridge technology from fossil fuels to a renewable and sustainable hydrogen economy," Industrial & Engineering Chemistry Research, Aug. 9, 2021, 60(32):11855-81.

Erlebacher et al., "Carbon Dioxide-Free Hydrogen and Solid Carbon from Natural Gas Via Metal Salt Intermediates," Advanced Research Projects Agency-Energy, Jan. 25, 2021, 10 pages.

International Preliminary Report on Patentability in International Appln. No. PCT/US2023/010290, mailed on Jul. 18, 2024, 11 pages.

International Search Report and Written Opinion in International Appln. No. PCT/US2023/010290, mailed on Jul. 25, 2023, 15 pages.

Vogel et al., "Heavy Metal Removal from Sewage Sludge Ash by Thermochemical Treatment with Gaseous Hydrochloric acid," Environ. Sci. Technol., Aug. 5, 2011, 45(17):7445-7450.

[No Author], "Lightweight Materials R&D Program," U.S. Department of Energy, 2013, DOE/EE-1039, 202 pages.

Amini et al., "Nucleation and growth kinetics of graphene layers from a molten phase," Carbon, Jan. 2013, 51:110-123.

Das, "Life cycle assessment of carbon fiber-reinforced polymer composites," The International Journal of Life Cycle Assessment, Feb. 22, 2011, 16(3):268-282.

Edie et al., "Melt spinning pitch-based carbon fibers," Carbon, 1989, 27(5):647-655.

El Naggar et al., "Novel intensified nano-structured zero-valente nickel alloy based catalyst for hydrogen production via methane catalytic decomposition," Renewable and Sustainable Energy Reviews, Jan. 2016, 53:754-765.

Ermakova et al., "Effective catalysts for direct cracking of methane to produce hydrogen and filamentous carbon: Part I. Nickel catalysts," Applied Catalysis A: General, Jun. 2000, 201(1):61-70.

Gill et al., "Cost Estimation Model for PAN Based Carbon Fiber Manufacturing Process," Proceedings of the ASME 2016 11th International Manufacturing Science and Engineering Conference: vol. 1: Processing, Sep. 27, 2016, 139:041011, 9 pages.

Hu et al., "Ultra-fast synthesis of graphene by melt spinning," Carbon, Sep. 2013, 61:299-304.

Huang, "Fabrication and Properties of Carbon Fibers," Materials, Dec. 2009, 2(4):2369-2403.

International Preliminary Report on Patentability in International Appln. No. PCT/US2022/011691, mailed on Jul. 20, 2023, 6 pages.

International Preliminary Report on Patentability in International Appln. No. PCT/US2022/014721, mailed on Aug. 10, 2023, 8 pages.

International Search Report and Written Opinion in International Appln. No. PCT/US2022/011691, mailed on Apr. 21, 2022, 7 pages.

International Search Report and Written Opinion in International Appln. No. PCT/US2022/014721, mailed on May 19, 2022, 10 pages.

Jentoft et al., "Solid-acid-catalyzed alkane cracking mechanisms: evidence from reactions of small probe molecules," Topics in Catalysis, Nov. 1997, 4(1-2):1-13.

Koyama et al., "Formation of Carbon Fibers from Benzene," Carbon, Dec. 1972, 10(6):757-758.

Liebermann, "Rapidly solidified alloys made by chill block melt-spinning processes," Journal of Crystal Growth, Dec. 1984, 70(1-2):497-506.

Liu et al., "The formation of kish graphite," Carbon, 1991, 29(4-5):547-555.

Muradov, "CO2-Free Production of Hydrogen by Catalytic Pyrolysis of Hydrocarbon Fuel," Energy Fuels, Jan. 1998, 12(1):41-48.

Pozzo et al., "Hydrogen dissociation and diffusion on transition metal (= Ti, Zr, V, Fe, Ru, Co, Rh, Ni, Pd, Cu, Ag)-doped Mg(0001) surfaces," International Journal of Hydrogen Energy, Feb. 2009, 34(4):1922-1930.

Singleton et al., "The C—Ni (Carbon-Nickel) system," Bulletin of Alloy Phase Diagrams, 1989, 10:121-126.

Strong et al., "The growth of large diamond crystals," Naturwissenschaften, Jan. 1972, 59:1-7.

Tibbetts et al., "Carbon fibers produced by pyrolysis of natural gas in stainless steel tubes, " Applied Physics Letters, Apr. 1983, 42(8):666-668.

Wang et al., "Methane Pyrolysis for Carbon Nanotubes and COx-Free H2 over Transition-Metal Catalysts," Energy Fuels, Dec. 18, 2018, 33(1):197-205.

(56)           References Cited

OTHER PUBLICATIONS

Compendex Accession No. E20243216833271, Aug. 23, 2024, Hughes et al., "Review of Carbon Nanotube Research and Development: Materials and Emerging Applications," ACS Applied Nano Materials, Aug. 1, 2024, 7(16):18695-18713, 3 pages.

* cited by examiner

| | HV | curr | det mode | WD | mag ⊞ | |
| --- | --- | --- | --- | --- | --- | --- |
| | 10.00 kV | 6.4 nA | ICE BSE | 4.6 mm | 250 x | 400 μm Helios |

| | HV | curr | det mode | WD | mag ⊞ | |
| --- | --- | --- | --- | --- | --- | --- |
| | 10.00 kV | 6.4 nA | ICE BSE | 4.6 mm | 5 000x | 10 μm Helios |

| ⚛ HV 10.00 kV | curr 6.4 nA | det mode ICE BSE | WD 4.6 mm | mag ⊞ 1 000x | 50 µm Helios |
|---|---|---|---|---|---|

| ⚛ HV 10.00 kV | curr 6.4 nA | det mode ICE BSE | WD 4.6 mm | mag ⊞ 10 000 x | 5 µm Helios |
|---|---|---|---|---|---|

300

100 µm

PRODUCTION OF CARBON MATERIALS VIA METAL MELT SPINNING

CROSS-REFERENCE TO RELATED APPLICATIONS

This application is a National Stage application under 35 U.S.C. § 371 of International Application No. PCT/US2022/014721 having an International Filing Date of Feb. 1, 2022, which claims the benefit of U.S. Application Ser. No. 63/144,092 entitled "PRODUCTION OF CARBON MATERIALS VIA METAL MELT SPINNING" filed Feb. 1, 2021, which are incorporated by reference herein in their entirety.

FEDERALLY SPONSORED RESEARCH OR DEVELOPMENT

This invention was made with government support under DE-AR0000616 and DE-AR0001019 awarded by the Advanced Research Projects Administration—Energy, part of the U.S. Department of Energy. The U.S. Government has certain rights in the invention.

TECHNICAL FIELD

The presently disclosed subject matter provides a process to produce carbon materials from metal-carbon alloys.

BACKGROUND

Carbon materials exist in a rich variety of structures, including graphene, graphite, diamond crystals, microporous carbon, carbon fibrils, and carbon fibers. These materials have unique physical, chemical, and mechanical properties that can be advantageous in a variety of applications, such as hydrogen storage, catalyst supports, and reinforcement materials for composites and plastics.

SUMMARY

This disclosure generally relates to processes for producing carbon materials. These processes typically include dissolving carbon in a molten metal, solidifying the metal-carbon alloy, performing a heat treatment, and separating the metal from the carbon by employing a cycle in which the metal is recycled and reused.

In an embodiment of this process, a metal-carbon alloy is formed by melting a metal and dissolving carbon within it to form a liquid in which the concentration of carbon exceeds the thermodynamic solubility of carbon in the solidified metal. Suitable metals include nickel, iron, manganese, and the like, as well as combinations of two or more metals.

In more detail, a metal-carbon alloy melt is solidified by a melt spinning process. In the melt spinning process, the molten alloy is heated in an inert atmosphere and ejected through an orifice onto a spinning metal wheel to produce a solid metal-carbon ribbon with carbon atoms embedded in the interstices of a metal lattice. The ribbon thickness is typically on the order of about 100 microns (μm) or less. A thermal treatment is then performed to precipitate carbon crystals on the surface of the ribbon, interspersed throughout the metal phase within the ribbon, or both. A crystallographic relationship may exist between the metal and precipitated carbon crystals. The carbon crystals can be separated from the ribbon by contacting the metal ribbon with a hydrogen halide (e.g., gaseous or solubilized as a hydrohalic acid). The hydrogen halide reacts with the metal to form a metal halide salt dissolved in the solution. Hydrogen gas, also formed as a product of the reaction of the metal and the hydrogen halide, can be collected for use in a later step, and pure carbon can be separated from the solution by filtration. The metal halide can be reduced back to pure metal by reaction with the hydrogen gas produced earlier in the process at temperatures near 1000° C. This formation of elemental metal regenerates hydrogen halide gas, which is collected for re-use. The metal can then be recycled for use in the metal-carbon alloy melt, and the carbon can be subjected to further processing. The hydrogen halide gas collected can be re-used to form metal halide in a subsequent iteration of the cycle. The method may be performed continuously or in a batchwise manner.

Provided herein are methods of transforming a first carbon material into a second carbon material. In some embodiments, the method comprises preparing a solid metal-carbon alloy comprising a metal and the first carbon material, wherein the first carbon material is dissolved in the metal; heat treating the solid metal-carbon alloy, thereby forming a first mixture comprising the metal and the second carbon material, wherein the second carbon material differs from the first carbon material; and, contacting the first mixture with a quantity of hydrogen halide to yield a quantity of hydrogen gas and a second mixture comprising the second carbon material and a metal halide comprising the metal. In some embodiments, the method further comprises separating components of the second mixture to yield a quantity of the metal halide and a quantity of the second carbon material. In some embodiments, the method further comprises contacting the quantity of the metal halide with an additional quantity of hydrogen gas to yield a quantity of the metal and an additional quantity of the hydrogen halide, wherein the additional quantity of the hydrogen halide is gaseous. In some embodiments, the method further comprises contacting an additional quantity of the second mixture with the additional quantity of the hydrogen halide gas. In some embodiments, the second carbon material and metal halide are separated by heating the second mixture to a temperature above the sublimation point of the metal halide, thereby evaporating the metal halide.

Certain aspects of the presently disclosed subject matter having been stated hereinabove, which are addressed in whole or in part by the presently disclosed subject matter, other aspects will become evident as the description proceeds when taken in connection with the accompanying Example and Figure as best described herein below.

DETAILED DESCRIPTION

The presently disclosed subject matter now will be described more fully with reference to the accompanying Figures, in which some, but not all embodiments of the presently disclosed subject matter are shown. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

Figure 1:
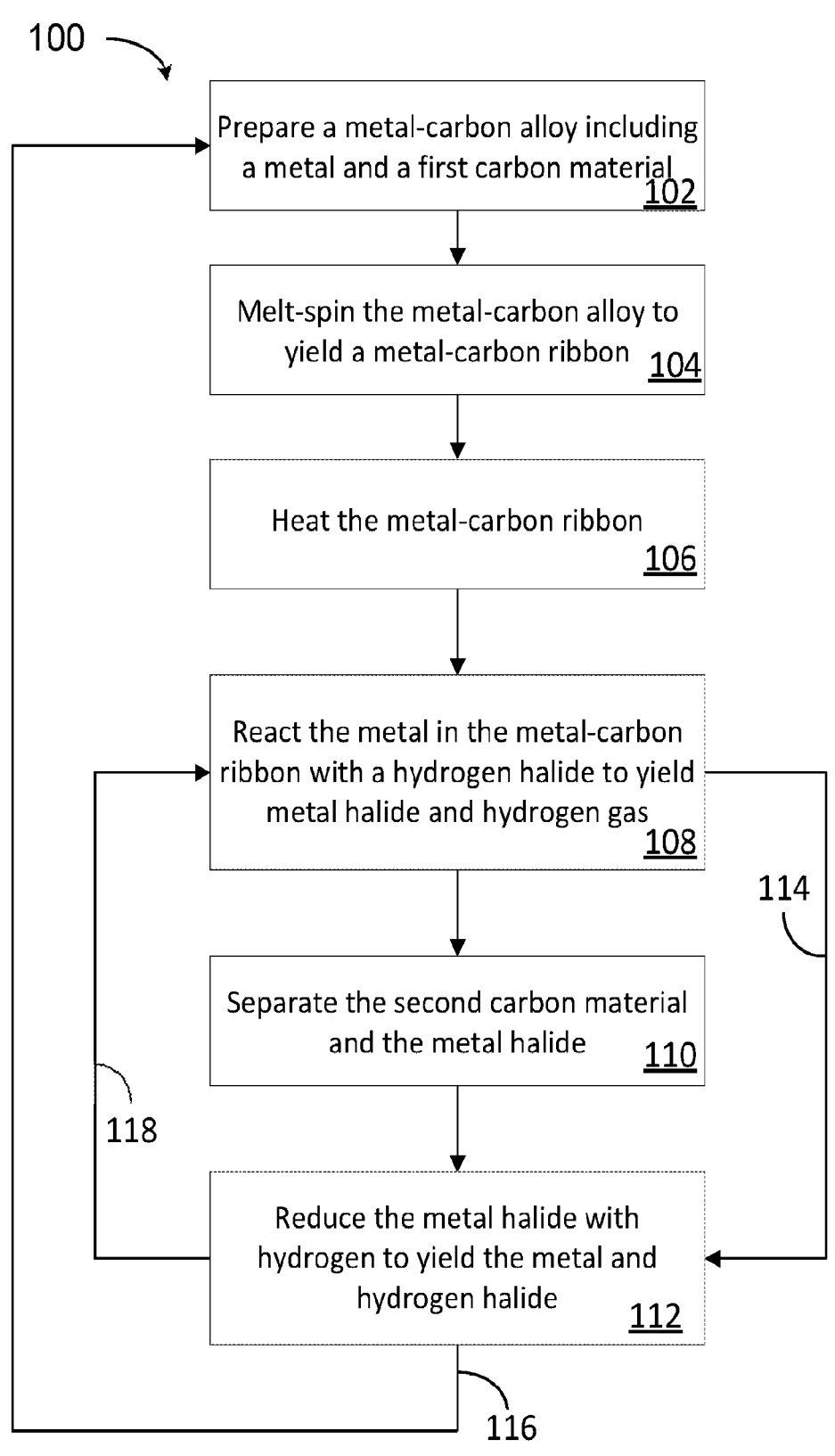
FIG. 1 is a flowchart showing operations in a method as described herein for producing carbon materials.

FIG. 1 is a flowchart showing operations in a process 100 for transforming a first carbon material to a second carbon material. The second carbon material differs from the first carbon material with respect to microstructure, mechanical properties, porosity, physical dimension, crystallinity, or any combination thereof. In some cases, the first and second carbon materials are different allotropes. In certain cases, the first and second carbon materials differ in size, shape, aspect ratio, density, surface area, molecular configuration, atomic structure, or any combination thereof. The second carbon material can include, consist of, or consist essentially of (e.g., include less than 1 wt % impurities) graphene, graphite, carbon black, carbon fibrils, carbon fibers, carbon nanowires, carbon nanobuds, carbon nanotubes, carbon nanoribbons, microporous carbon, carbon sponges, diamond crystals, or any combination thereof.

In 102, a carbon-metal alloy is prepared. The metal includes a metal or a combination of metals, including transition metals, that have a liquid phase in which the solubility of carbon is non-zero (i.e., some amount of carbon is soluble in the liquid phase). The metal can be combined with a first carbon material (e.g., carbon black powder). At a sufficiently high temperature, the first carbon material will dissolve in the liquid metal to form a molten metal-carbon alloy. The molten metal-carbon alloy can be made to contain carbon up to the point of saturation in the liquid phase. Depending on the alloy, the point of saturation may be as high as 50 atomic percent (at %). Examples of suitable metals include nickel, manganese, cobalt, iron, calcium, yttrium, copper, gold, and combinations of these metals. In one example, nickel and carbon form a eutectic system with ~8 at % carbon at 1326° C., and the solubility rises to nearly 15 at % by 1500° C. Similar high solubilities of carbon can be found in manganese-carbon systems, which exhibit nearly 40 at % solubility at 1500° C., as well as iron-carbon systems.

In 104, the molten metal-carbon alloy is solidified. In one implementation, solidification is achieved by melt-spinning to yield a metal-carbon ribbon. In melt spinning, the molten metal-carbon alloy is heated in an atmosphere substantially free of water or oxygen, and ejected onto a spinning water-cooled wheel (e.g., a copper wheel or the like) to yield a thin metal-carbon ribbon by melt spinning. The linear velocity of the wheel is typically between 10 m/s and 100 m/s, but can be greater, which results in a fast formation rate. Increasing the wheel velocity can result in higher solidification rates and thinner ribbons. Solidification rates greater than 1 m/s can lead to the formation of non-equilibrium metastable materials.

For some melt-spun metal-carbon ribbons (e.g., nickel-carbon), up to 15 at % of carbon can be dissolved into solid metal such that—rather than phase separating into distinct carbon and metal phases—the carbon atoms are uniformly distributed throughout the metal crystals of the melt-spun ribbon. In the metal-carbon ribbon, carbon atoms are packed into interstices of the crystalline metal lattice, causing measurable strain. The typical form factor of the melt-spun ribbon is a strip having a thickness between 1 and 100 microns, a width of 1-5 mm, and a length of greater than 1 meter.

In 106, the metal-carbon ribbon is heated to promote precipitation of carbon atoms in the ribbon, thereby relieving strain associated with packing of the carbon atoms in the interstices of the crystalline metal lattice. A second carbon material, which differs from the first carbon material, is precipitated as crystals on the surface of the carbon-metal ribbon, within the carbon-metal ribbon, or both.

In 108, the carbon-metal ribbon, which includes the second carbon material, is contacted with a hydrogen halide and reacts with the hydrogen halide to yield a metal chloride, and hydrogen gas, as shown by Reaction 1.

$$M+2HX \rightarrow MX_2+H_2 \tag{1}$$

In Reaction 1, M represents a metal having a valence of +2, and X represents a halide (e.g., chloride, bromide, fluoride, or iodide). However, other metal valences are possible, and the stoichiometry is adjusted accordingly. The second carbon material, which can be separated from the products of Reaction 1, can be used as is or subjected to further processing to alter its properties for specific applications.

According to the thermodynamic properties of the constituents of Reaction 1, this reaction typically runs fully to completion at temperatures between 0° C. and 400° C. Higher pressures (e.g., between 1 atm and 5000 atm) can also be used to drive the reaction to completion. In a first implementation, Reaction 1 occurs in an aqueous solution of hydrogen halide (i.e., hydrohalic acid). In another implementation, gaseous hydrogen halide at high pressure (e.g., between 1 atm and 5000 atm) or high temperature (e.g., between 400° C. and 1000° C.) is used as a reactant.

In 110, the second carbon material and the metal halide are separated. In the first implementation described with respect to 106, the second carbon material can be separated from the metal halide by a mechanical method (e.g., filtering). In the second implementation described with respect to 106, the second carbon material can be separated from the metal halide by subliming the metal halide to yield a metal halide gas, or by melting the metal halide under conditions that allow for separation (e.g., filtration) of the second carbon from the molten metal halide.

When the metal used in process 100 includes nickel and the halide is chloride, the nickel chloride produced in 108 readily sublimes at temperatures above 700° C. At 1000° C., the vapor pressure of nickel chloride is approximately 1 atm, and sublimation can occur at rates greater than 1 kg/sec per m² of nickel chloride surface area. Sublimed nickel chloride gas can be collected by condensing it on a surface at a temperature of less than about 700° C. Anhydrous manganese and iron chlorides possess the same crystal structure as anhydrous nickel chloride, and will evaporate or melt at high temperatures (e.g., between 700° C. and 1100° C.), separating from the second carbon material. These chlorides form at low temperatures (e.g., less than about 400° C.) and can form even more effectively at high pressures (e.g., between 1 atm and 5000 atm).

In 112, the metal halide from 110 is reduced by hydrogen gas (e.g., hydrogen gas from 108 provided via 110), as shown by Reaction 2.

$$MX_2+H_2 \rightarrow M+2HX \tag{2}$$

Reaction 2, which corresponds to Reaction 1 in reverse, occurs at elevated temperatures (e.g., above 600° C.). Again, other metal valences are possible, and the stoichiometry is adjusted accordingly. At 1000° C., the reduction reaction can thermodynamically run to completion, producing hydrogen halide gas and the metal of the metal-carbon alloy in 102. The metal and hydrogen halide gas are cooled. The metal can be combined via 116 with additional carbon (e.g., additional first carbon material), and provided to 102 for preparation of additional metal-carbon alloy. The hydrogen halide gas can be provided via 118 to 108.

EXAMPLES

The following Examples are included to provide guidance to one of ordinary skill in the art for practicing implementations of the presently disclosed subject matter. In light of the present disclosure and the general level of skill in the art, those of skill can appreciate that the following Example is intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Figure 2:
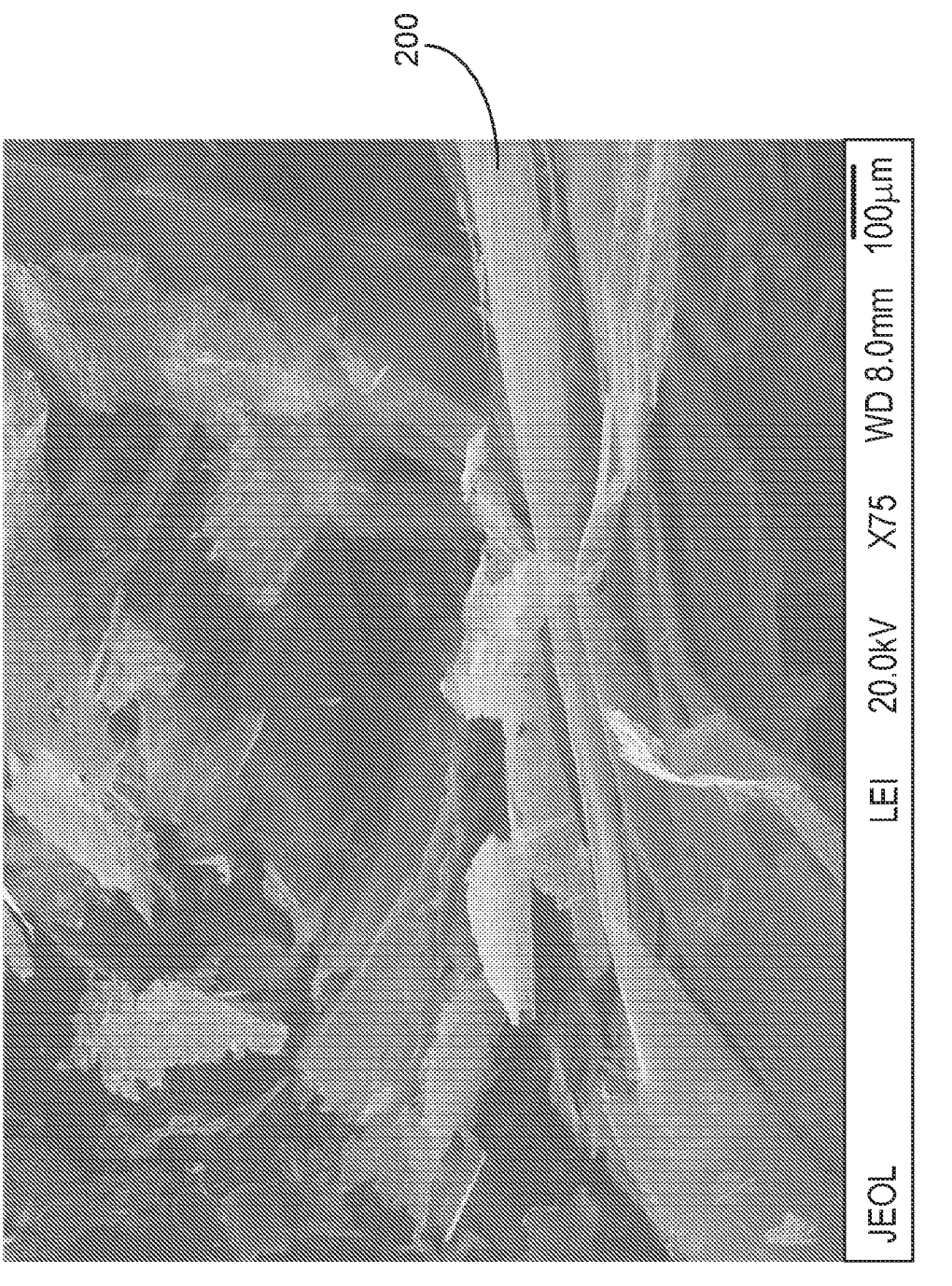
FIG. 2 is a scanning electron microscope (SEM) image of carbon materials formed by methods described in this disclosure.
Figure 3A:
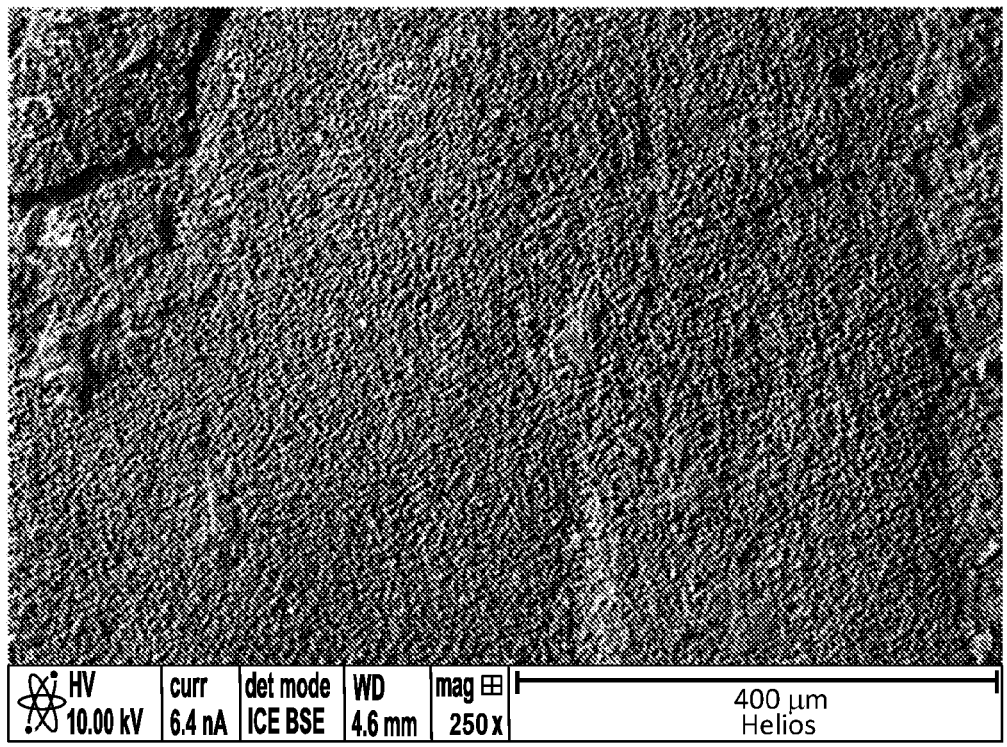
FIGS. 3A-3D are SEM images of carbon materials formed by methods described in this disclosure.
Figure 3B:
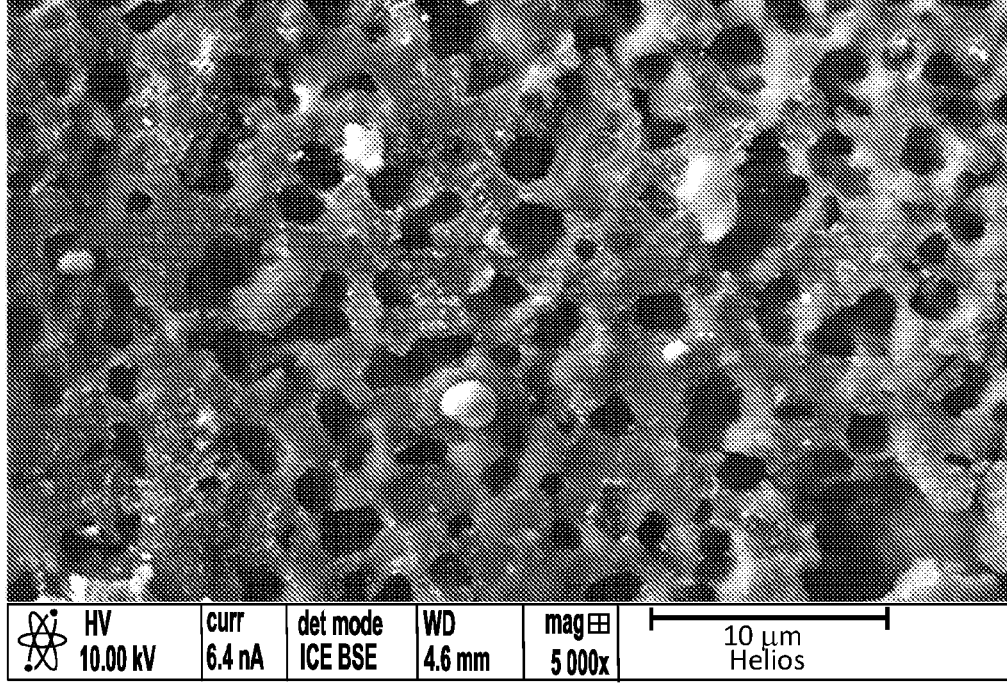
Figure 3C:
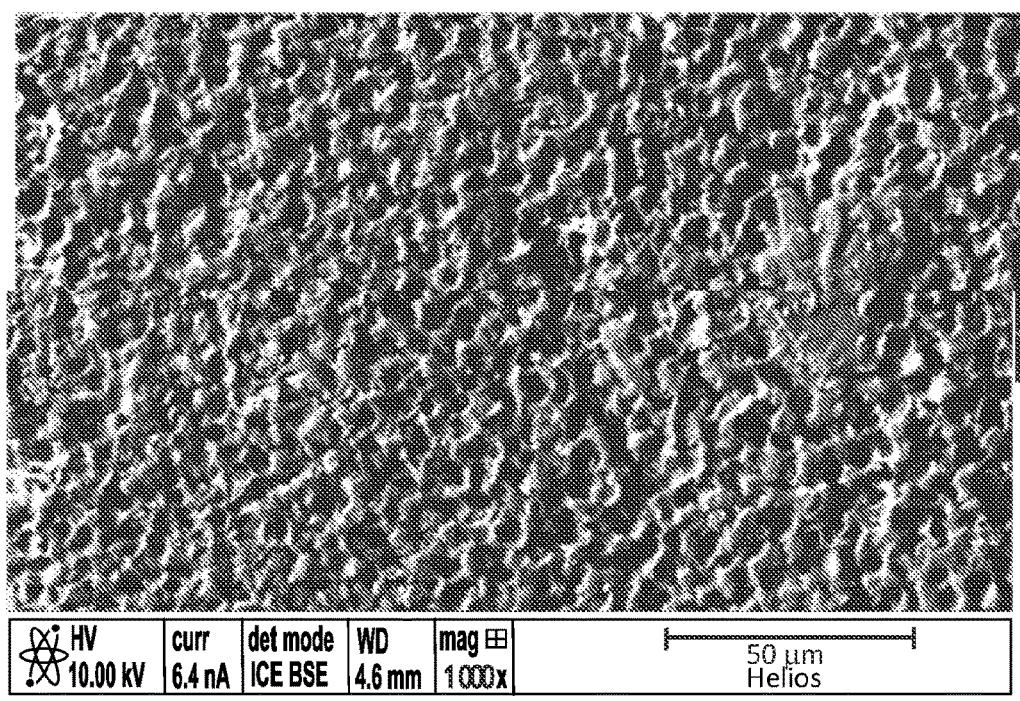
Figure 3D:
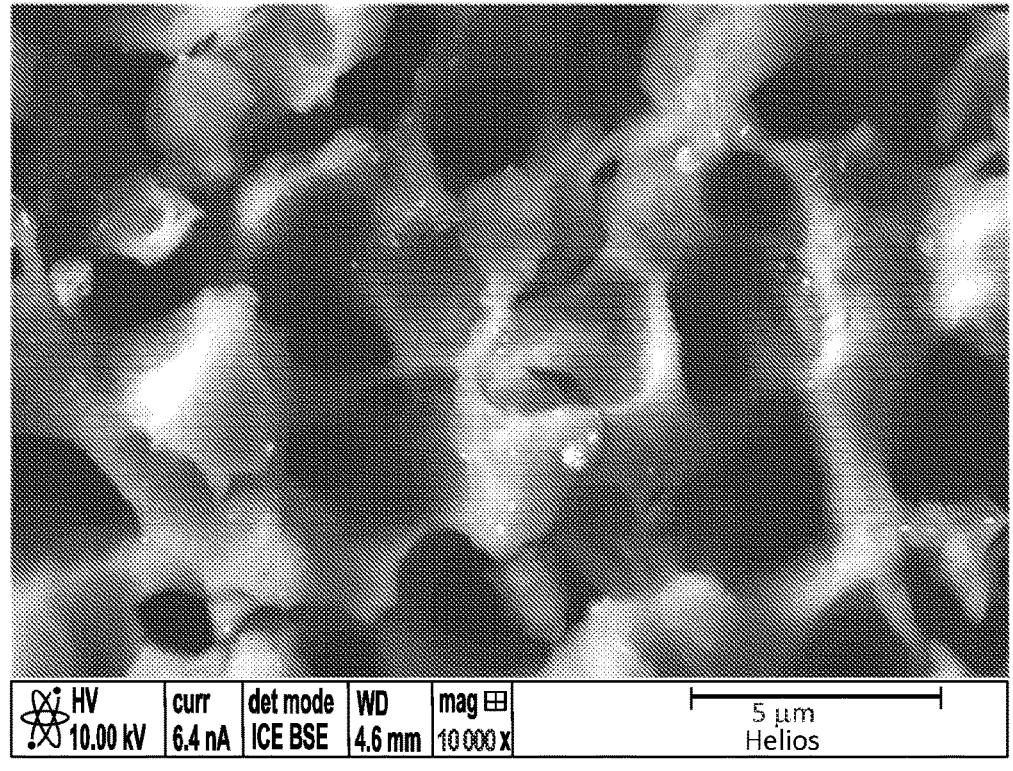

A 25 g ingot with 90 at % Ni and 10 at % C was loaded into a boron nitride crucible and placed in the melt spinning apparatus (Arcast Inc., Maine). The chamber was evacuated to create an inert atmosphere and the charge was melted by radiofrequency (RF) induction to a temperature of 100° C. above the melting temperature of the alloy. The melt was ejected from the crucible using a back pressure of argon at 8 psig onto a copper wheel rotating with a linear velocity of 48 m/s. A nickel-carbon ribbon with a thickness of 35 μm was produced. The ribbon was subsequently annealed at 800° C. in a tube furnace under a 99.999% argon atmosphere to drive carbon precipitation. The nickel-carbon ribbon was then treated with 10 M hydrochloric acid at room temperature and the carbon was filtered and rinsed thoroughly with distilled water. The precipitated carbon was found in the form of high aspect ratio graphite flakes 200 as shown in FIG. 2 (scale bar 100 μm). The lateral dimensions of the flakes roughly corresponded to the lateral dimensions of the ribbon—namely, a few microns in width and thickness, but many tens of microns long. This material exhibited a moderately high surface of 326 m²/g as measured by Brunauer-Emmett-Teller (BET). The BET isotherm was similar to BET isotherms from pine wood-derived activated carbon.

Example 2

A 15 g mass of an $Fe_{83}C_{17}$ (at %) alloy was loaded into a ZSBN grade boron nitride (Saint Gobain) crucible machined with a circular orifice, and placed in the melt spinning apparatus (Arcast Inc., Maine). The chamber was evacuated to create an inert atmosphere and the charge was melted by radiofrequency (RF) induction to a temperature of about 100° C. above the melting temperature of the alloy. The melt was ejected from the crucible using a back pressure of purified argon at 6 psig onto a water-cooled copper wheel rotating with a linear velocity of 48 m/s. The resulting iron-carbon ribbons were strips with a length of about 3 cm, a width of about 2 mm, and a thickness of about 50 μm thick.

The ribbon was subsequently annealed at 1000° C. for 1 hour in a tube furnace under a 99.999% argon atmosphere to drive carbon precipitation. The annealed ribbon was then treated with 4 M hydrochloric acid at room temperature until all the metal dissolved, and the remaining carbon was filtered and rinsed thoroughly with distilled water. As shown in the scanning electron microscope (SEM) images of FIGS. 3A-3D, the precipitated carbon was in the form of a sponge: an interconnected, monolithic carbon material with a multiplicity of pores having dimensions on the order of about 5 μm or less.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Example 3

Figure 4:
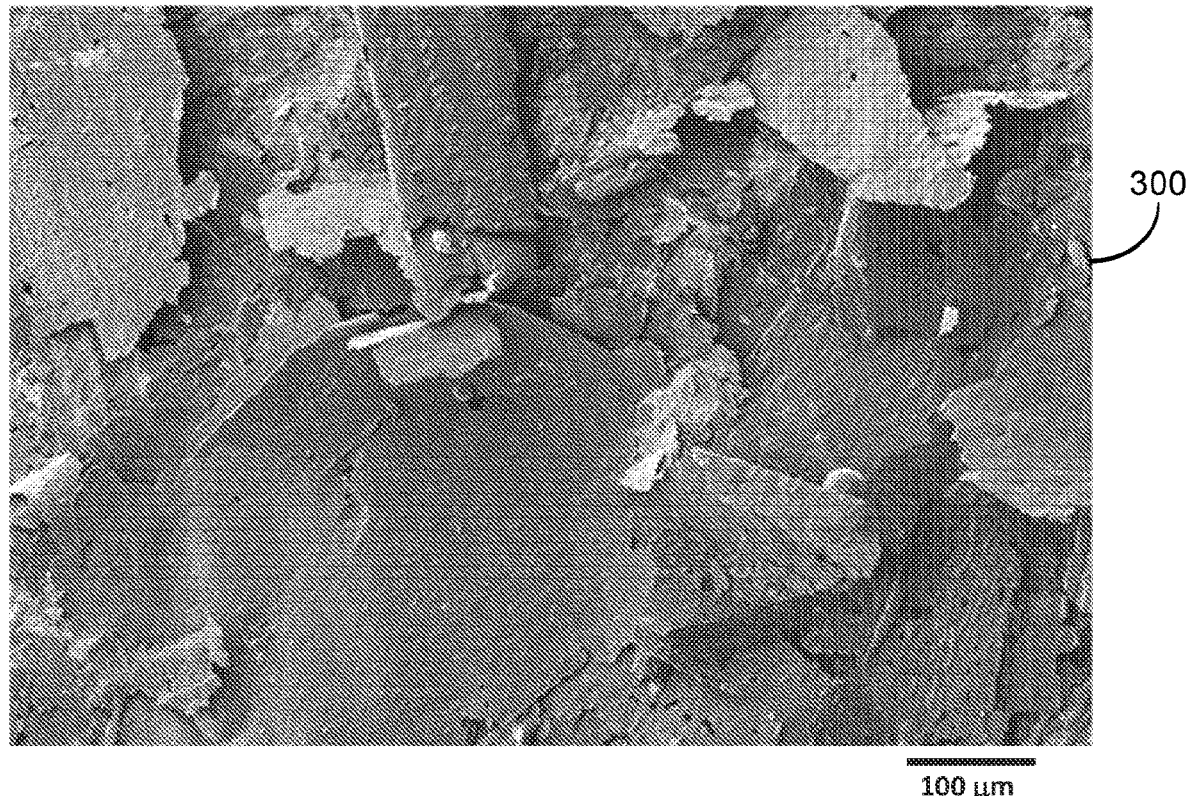
FIG. 4 is a SEM image of carbon materials formed by methods described in this disclosure.

A 25 g ingot with 88 at % Ni and 12 at % C was loaded into a boron nitride crucible and placed in the melt spinning apparatus (Arcast Inc., Maine). The chamber was evacuated to create an inert atmosphere and the charge was melted by radiofrequency (RF) induction to a temperature 100° C. above the melting temperature of the alloy. The melt was ejected from the crucible using a back pressure of argon at 8 psig onto a copper wheel rotating with a linear velocity of 48 m/s. A nickel-carbon ribbon with a thickness of 32 μm was produced. The ribbon was subsequently annealed at 1000° C. in a tube furnace under a 99.999% argon atmosphere to drive carbon precipitation. The nickel-carbon ribbon was then treated with 10 M hydrochloric acid at room temperature and the carbon was filtered and rinsed thoroughly with distilled water. The precipitated carbon was found in the form of high aspect ratio graphite flakes 300 as shown in FIG. 4 (scale bar 100 μm). The lateral dimensions of the flakes roughly corresponded to the lateral dimensions of the ribbon—namely, a few microns in width and thickness, but many tens of microns long.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of transforming a first carbon material into a second carbon material, the method comprising:

preparing a solid metal-carbon alloy comprising a metal and the first carbon material, wherein the first carbon material is dissolved in the metal;

heat treating the solid metal-carbon alloy, thereby forming a first mixture comprising the metal and the second carbon material, wherein the second carbon material differs from the first carbon material; and contacting the first mixture with a quantity of hydrogen halide to yield a quantity of hydrogen gas and a second mixture comprising the second carbon material and a metal halide comprising the metal.

2. The method of claim 1, further comprising separating components of the second mixture to yield a quantity of the metal halide and a quantity of the second carbon material.

3. The method of claim 2, further comprising contacting the quantity of the metal halide with an additional quantity of hydrogen gas to yield a quantity of the metal and an additional quantity of the hydrogen halide, wherein the additional quantity of the hydrogen halide is gaseous.

4. The method of claim 3, further comprising contacting an additional quantity of the second mixture with the additional quantity of the hydrogen halide gas.

5. The method of claim 3, wherein contacting the quantity of the metal halide with the additional quantity of the hydrogen gas comprises chemical reduction of the metal in the metal halide to yield the metal and the additional quantity of the hydrogen halide.

6. The method of claim 5, wherein the chemical reduction occurs at a temperature greater than about 500° C.

7. The method of claim 5, wherein the additional quantity of the hydrogen gas comprises the quantity of the hydrogen gas.

8. The method of claim 1, wherein preparing the solid metal-carbon alloy comprises:

preparing a molten metal-carbon alloy comprising the metal and the first carbon material; and solidifying the molten metal-carbon alloy to yield the solid metal-carbon alloy.

9. The method of claim 8, wherein solidifying the molten metal-carbon alloy promotes supersaturation of the metal with the first carbon material.

10. The method of claim 8, wherein solidifying the molten metal-carbon alloy comprises cooling the molten metal-carbon alloy.

11. The method of claim 10, wherein cooling the molten metal-carbon alloy comprises cooling at a rate of at least 10,000° C./second.

12. The method of claim 10, wherein solidifying the molten metal-carbon alloy comprises melt spinning the molten metal-carbon alloy.

13. The method of claim 12, wherein melt spinning the molten metal-carbon alloy comprises contacting the molten metal-carbon alloy with a spinning wheel comprising copper.

14. The method of claim 13, wherein melt spinning the molten metal-carbon alloy yields solid ribbons comprising the metal supersaturated with the first carbon material.

15. The method of claim 14, further comprising controlling a velocity of the spinning wheel, controlling a volumetric flow rate of the molten metal-carbon alloy, or both to achieve a selected thickness of the solid ribbons.

16. The method of claim 15, further comprising controlling a velocity of the spinning wheel and a volumetric flow rate of the molten metal-carbon alloy at the same time to achieve the selected thickness of the solid ribbons.

17. The method of claim 15, wherein controlling the volumetric flow rate of the molten metal-carbon alloy comprises controlling an ejection pressure on the molten metal-carbon alloy, selecting an orifice diameter from which the molten metal-carbon alloy is ejected, or both.

18. The method of claim 14, wherein a thickness of the solid ribbons is between about 0.5 μm and about 1000 μm.

19. The method of claim 1, wherein heating the solid metal-carbon alloy comprises precipitating the second carbon material from the first mixture.

20. The method of claim 1, wherein heating the solid metal-carbon alloy comprises heating to a maximum temperature less than the melting point of the metal.

21. The method of claim 20, wherein heating the solid metal-carbon alloy comprises heating for a length of time exceeding one second.

22. The method of claim 20, wherein heating the solid metal-carbon alloy comprises pulling a length of the metal-carbon alloy through a heated zone, thereby inducing directional precipitation.

23. The method of claim 1, wherein the first carbon material comprises at least 90 at % carbon.

24. The method of claim 1, wherein the second carbon material differs from the first carbon material with respect to microstructure, mechanical property, porosity, physical dimension, or any combination thereof.

25. The method of claim 1, wherein the metal comprises one or more of nickel, manganese, cobalt, calcium, iron, yttrium, gold, and copper.

26. The method of claim 1, wherein contacting the first mixture with the quantity of the hydrogen halide comprises contacting the first mixture with an aqueous solution comprising the hydrogen halide.

27. The method of the claim 26, wherein the aqueous solution comprising the hydrogen halide comprises hydrochloric acid.

28. The method of claim 26, wherein the second mixture comprises the metal halide dissolved in the aqueous solution.

29. The method of claim 28, further comprising filtering the aqueous solution to separate the second carbon material from the second mixture.

30. The method of claim 1, wherein the quantity of the hydrogen halide is hydrogen halide gas.

31. The method of claim 30, wherein contacting the first mixture with the quantity of the hydrogen halide gas occurs at a pressure between about 1 bar and about 5000 bar.

32. The method of claim 1, wherein the second carbon material and the metal halide are separated by heating the second mixture to a temperature above the sublimation point of the metal halide, thereby evaporating the metal halide.

* * * * *